United States Patent [19]
Andrisin, III et al.

[11] Patent Number: 5,103,530
[45] Date of Patent: Apr. 14, 1992

[54] HUB AND WHEEL ASSEMBLY WITH SHOCK ABSORBER

[75] Inventors: John J. Andrisin, III, Middleburg Hts.; Thomas Wiatrak, Brunswick; C. William Lauro, Akron, all of Ohio

[73] Assignee: Century Products Company, Macedonia, Ohio

[21] Appl. No.: 590,572

[22] Filed: Sep. 28, 1990

[51] Int. Cl.⁵ ............................................. B60B 33/02
[52] U.S. Cl. ...................................... 16/20; 16/35 R; 16/44; 16/48
[58] Field of Search ............... 16/35 R, 35 D, 44, 48, 16/20

[56] References Cited

U.S. PATENT DOCUMENTS

| | | | |
|---|---|---|---|
| D. 296,540 | 7/1988 | Perego . | |
| 2,541,514 | 2/1951 | Herold | 16/48 |
| 2,753,946 | 7/1956 | Quayle | 16/44 |
| 2,915,776 | 12/1959 | Hanson et al. | 16/44 |
| 3,653,681 | 4/1972 | Virtue . | |
| 3,967,342 | 7/1976 | Gebhard . | |
| 4,083,579 | 4/1978 | Basey, Jr. et al. | |
| 4,559,669 | 12/1985 | Bonzer et al. | 16/44 |
| 4,608,729 | 9/1986 | Huang | 16/44 |
| 4,731,899 | 3/1988 | Huang | 16/44 |
| 4,736,648 | 4/1988 | Perego . | |
| 4,739,851 | 4/1988 | Perego . | |
| 4,741,551 | 5/1988 | Perego . | |
| 4,763,910 | 8/1988 | Brandli et al. | 16/44 |
| 4,773,124 | 9/1988 | Nakao et al. | 16/44 |
| 4,805,259 | 2/1989 | Kassai | 16/35 R |
| 4,819,958 | 4/1989 | Perego . | |
| 4,831,689 | 5/1989 | Lo | 16/44 |
| 4,847,945 | 7/1989 | Schwartz et al. | 16/44 |

FOREIGN PATENT DOCUMENTS 2204484 11/1988 United Kingdom ............... 16/35 R

Primary Examiner—Robert L. Spruill
Assistant Examiner—Donald Gurley
Attorney, Agent, or Firm—Thomas F. Smegal, Jr.

[57] ABSTRACT

A hub and wheel assembly for light load vehicle including baby carriages, infant strollers, wheelchairs and the like, the assembly having tandem wheels and a shock absorbing member in a trailing link suspension configuration. The assembly includes a wheel locking mechanism to lock one or both wheels into a secured position preventing the wheels from rolling about the axle. The wheel assembly incorporating a thrust bearing system to provide smooth and controlled swiveling relative to the vehicle body or frame and eliminates creeping and wobble. A swivel lock mechanism is also provided to allow the user to lock the tandem wheel assembly in a angular position relative to the vehicle body thereby preventing swiveling about the longitudinal axis of the swivel base housing. Each wheel is mounted to the axle in tandem using two low friction bearings and having a low-profile tire mounted to a rim with a reflective area for increasing safety in low elimination environments.

13 Claims, 3 Drawing Sheets

HUB AND WHEEL ASSEMBLY WITH SHOCK ABSORBER

BACKGROUND OF THE INVENTION

The invention relates to a hub wheel assembly having shock absorber means for use on light load bearing vehicles. More particularly, the invention relates to swivel-mounted tandem wheel assemblies with shock absorbing means particularly adapted for use on movable vehicles such as infant strollers, baby carriages, carts or wheelchairs.

Most movable vehicles for light-load duty, including those of infant carriers, employ relatively simple methods of securing the wheel systems to the vehicle chassis. Most commonly, each leg or strut of the vehicle chassis is connected to a single wheel mounted on a rigid bracket. The bracket is typically U-shaped to extend down on either side of the wheel to support the extreme ends of an axle disposed through the wheel hub. To provide maneuverability, wheel systems are typically pivotably mounted to the frame of the vehicle. As such, the wheel can swivel freely when an angular force is applied to the vehicle to pivot or steer the wheel in the desired direction of motion. One embodiment of this type of apparatus is shown in U.S. Pat. No. 3,653,681 to Virtue.

Prior art single-wheel apparatus have several disadvantages. For example, a single wheel swivel-mounted to a rigid frame tends to track poorly when exposed to lateral forces. Many swivel-mounted wheel systems are attached by a single rivet point which causes the wheel to shimmy and wobble when exposed to uneven surfaces and propelled in a non-linear direction. Even when ball bearing surfaces are employed, when a force perpendicular to the orientation of the wheel is applied, the wheel tends to bind and skid sideways rather than rotate in the direction of the angular force.

In an attempt to add stability and tracking qualities to light load vehicles, tandem wheel assemblies have been employed. Tandem wheel arrangements for carts and carriages are well known in the art. For example, U.S. Pat. No. 3,967,342 to Gebhard discloses a swivel wheel arrangement for baby carriages having a tandem wheel system with one wheel mounted on either side of a central spindle. The device uses a central spindle assembly having a vertical shaft rotatably mounted in an upper sleeve. The apparatus uses a pair of mounting plates disposed on either side of the sleeve and secured to the shaft with a pin. The wheels are connected to the free end of the plates by an axle assembly. A resilient flexible ring is secured between the two mounting plates and restricts the rotation of the plates about the centralized pin. Although an improvement over the single-wheel systems, this device still has several disadvantages.

One disadvantage is that the centralized shaft is rotatably mounted into a sleeve and does not employ any type of ball bearing surfaces. The weight-bearing engagement between the upper sleeve and a shoulder associated with the central spindle provides a rotatable contact surface between the two elements. This type of arrangement is prone to wear and binding contaminants entering through the spindle region and inhibiting rotation between the spindle and the sleeve. Additionally, the relatively large surface area in rotational contact is prone to increased friction when exposed to the lateral loads common in this type of carriers. Additionally, the resilient pad mechanism used for suspension is insufficient. Very limited travel is available and the resulting device does little to smooth out the resulting ride.

SUMMARY OF THE INVENTION

The present invention comprises a hub-wheel assembly having a suspension system which offers several advantages over the prior art. First, the invention employs a relatively large bore pre-loaded thrust bearing system to provide smooth and controlled swivel rotation between the vehicle frame and the wheel assembly even under large radial loads. Such a system all but eliminates wheel assembly creeping and wobble so common in light-weight carriers such as shopping carts.

A second advantage of the invention is a spring-loaded trailing link suspension system that allows greater travel than suspension systems of the prior art to provide a smoother ride and increased wheel-to-surface contact.

Thirdly, a wheel locking mechanism is employed to allow the user to lock the rotation of the tandem wheels by moving a small lever. This lock system allows the user to completely prohibit wheel rotation, and thus vehicle motion, when desired.

A fourth feature of the invention is a swivel locking mechanism which prevents the tandem wheel assembly from swiveling when desired. The mechanism provides a small cap at the top of the swivel housing assembly which is positionable by the user to switch between a locked and an unlocked position. In the unlocked position, the wheel assembly can rotate 360° about the axis of the swivel base. In the locked position, the wheel assembly is locked in a linear position and cannot swivel.

A fifth feature of the invention is a unique wheel configuration comprising a pair of low profile tires each with a wheel rim having a reflective portion for added safety in low illumination environments. Each wheel rim is supported by two low-friction bearings to provide smooth rotation. In total, each hub wheel assembly has five bearings: one for the swivel feature and two for each wheel for a total of four in the wheel assembly.

One of the primary advantages of the invention is a hub and wheel assembly which provides a ride which is much more stable and smooth relative to the prior art. The four bearing, dual wheel configuration in combination with the thrust-bearing swivel assembly and the trailing link suspension system provide a very smooth and stable ride for the load being transported while providing excellent tracking qualities for the vehicle.

Other features and advantages of the invention will appear from the following description, in which the preferred embodiment has been set forth in detail, in conjunction with the accompanying drawings.

DETAILED DESCRIPTION OF THE PREFERRED EMBODIMENT

Figure 1:
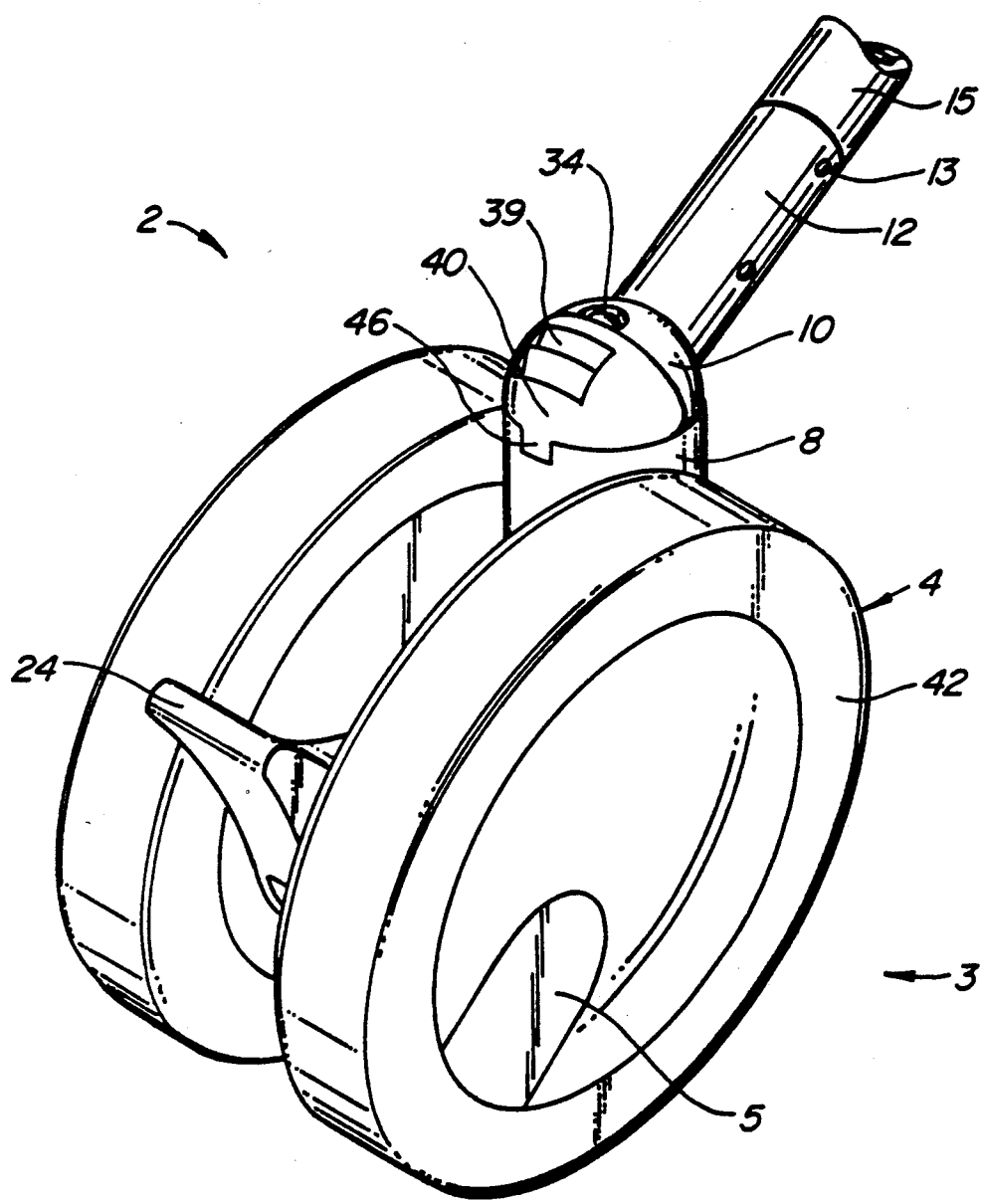
FIG. 1 is a perspective view of the preferred embodiment of the invention showing the swivel base assembly disposed between the tandem wheels with the wheel lock lever extending outwardly, the cap shown in a locked position.

Referring to FIG. 1, the hub and wheel assembly 2 includes a swivel base assembly 6 and a wheel assembly 3. A pair of wheels 4 are rotatably mounted on either side of the swivel base assembly 6. The swivel base assembly 6 comprises a top 10 which is swivel-mounted to a base 8. A stroller leg housing 12 extends outwardly from, and is integral with, the top 10. In the preferred embodiment of the invention, the stroller leg housing 12 is configured to accept a stroller leg 15 or similar member at an angle relative to the longitudinal axis of the swivel base assembly 6 as shown in FIG. 1. The stroller leg 15 can be secured to the stroller leg housing 12 using screws 13.

Figure 2:
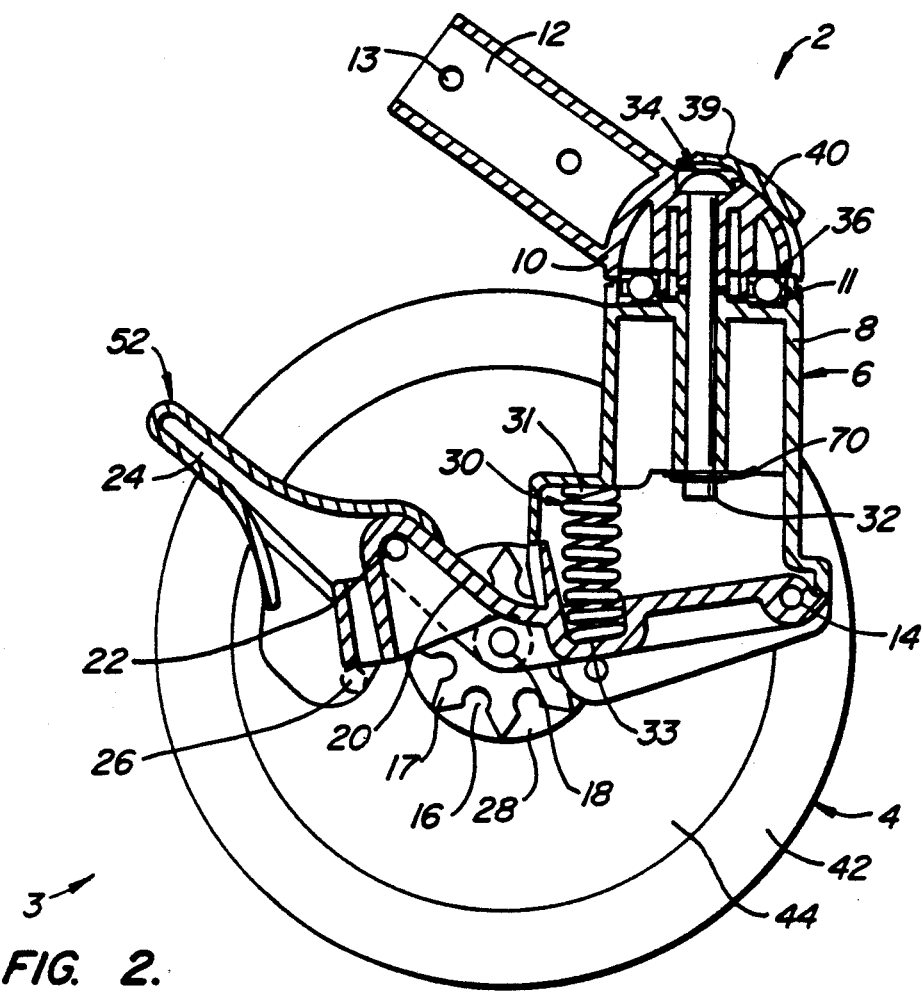
FIG. 2 is a side view of the invention with one wheel removed to show a cross section detail of the swivel base assembly including the wheel lock lever and the suspension components, the cap and the wheel lock lever both shown in the unlocked position.

As shown in the cross-sectional view provided in FIG. 2, the stroller leg housing 12 may include one or more apertures 13 for receiving screws or suitable alternatives for fixedly securing the swivel base assembly 6 to the vehicle frame or stroller leg 15. The swivel base assembly 6 has a top 10 rotatably mounted to a base 8 using a bolt 34 centrally disposed through the top 10 and secured to the base 8 using a nut 32 and washer 70. A thrust bearing 36 is disposed between the top 10 and the base 8 to provide a rotatable low friction contact surface between the top 10 and the base 8 at the bearing races 11. The thrust bearing provides a smooth swivel junction even under large loads which run parallel to the axis of rotation, i.e., loads parallel to the bolt 34 caused by the load exerted from the vehicle. The thrust bearing 36 is preloaded by tension created from the bolt 34 when secured by the nut 32 and washer 70 connecting the top 10 and the base 8 of the swivel base assembly 6. This preloading prevents creeping or spinning of the bearing races 11, thus eliminating undesired wobbling of the swivel base assembly 6 and adding stability to the assembly. At the lower end of base 8, an axle retainer arm 20 is pivotably mounted to the base 8 at a pivot point 14. A spring 30 is disposed in the swivel base assembly 6 between a spring anchor point 31 of the base 8 and a spring receptacle 33 formed in the axle retainer arm 20.

The wheel assembly 3 of the preferred embodiment has a pair of wheels 4, each wheel 4 having a tire portion 42 and a rim portion 44. The rim portion 44 has a centralized hub 28 on the internal side facing the base 8 as shown in FIG. 2. Alternatively, the centralized hub 28 may be formed so that it is exposed on both the internal side and the external side of the wheel 4. Preferably, the tire portion 42 has a low profile similar in proportion to that of a 60 series or a 70 series tire used on high performance automobiles. The rim portion 44 of each wheel 4 may include a reflective surface 5 on the external side to enhance safety when the apparatus is being used in low illumination environments. The reflective surface 5 is preferably provided on the external side of each rim portion 44 and covers a partial section of the surface area thereof. Alternatively, to maximize reflective surface area, the reflective surface 5 can cover the entire surface area of the rim portion 44 or can be part of a decorative rim covering or rim cap (not shown) which is secured to the external surface of the rim 44.

Two wheel bearings 19 are disposed at the center of the rim portion 44 for rotatably mounting the wheel 4 to an axle 18. Alternatively, the two wheel bearings 19 may be mounted in the hub 28 which, in turn, is located in the center of the rim portion 44. The rim 44 and hub 28 be made of a single piece of material or formed separately and secured together. The axle supports the wheel about the bearings 19 to provide a low friction rotational connection to the axle 18. The use of two sets of bearings 19 in each wheel 4 reduces the load on each bearing race and increases the life of the bearings while increasing the smoothness of rotation. The bearings 19 may be roller bearings, ball bearings or other suitable bearing construction. In the preferred embodiment, sealed ball bearings are used to prolong life and reduce maintenance.

The hub 28 is formed integral with the rim 44 and has a plurality of wheel lock latches 16 on the internal side to be used in conjunction with a wheel lock lug 26 in a manner explained below. Each wheel 4 of the wheel assembly 3 is rotatably disposed on a common axle 18. The axle 18 is supported by the axle retainer arm 20 pivotally mounted to the base 8 such that the axle 18 is offset from longitudinal axis of the swivel base assembly.

Referring back to FIG. 2, a wheel lock lever 24 is pivotably mounted to the axle retainer arm 20 near the free end of the axle retainer arm 20 at a lever pivot 22. The wheel lock lever 24 is formed having a wheel lock lug 26 protruding in the direction of the hub 28 and positioned such when the wheel lock lever 24 is rotated about the lever pivot 22, the lug 26 can be pivoted between an unlocked position 52 shown in FIG. 2 and a locked position 54 shown in FIG. 4.

Figure 4:
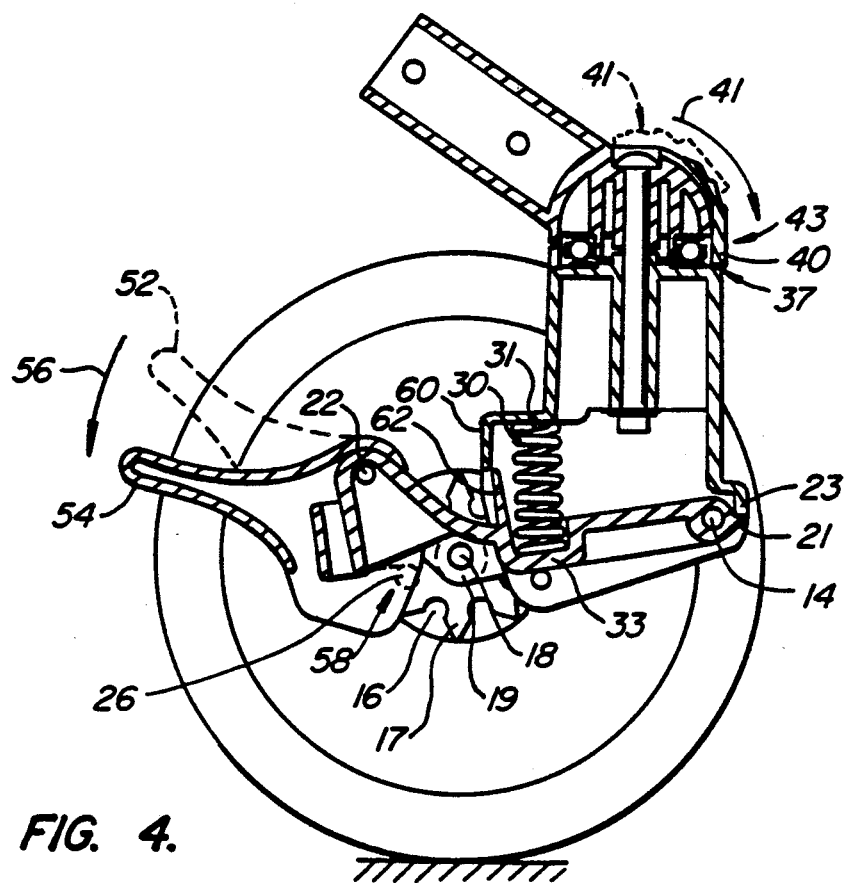
FIG. 4 is a side view of the preferred embodiment of the invention with one wheel removed to show a cross section of the swivel base assembly with the wheel lock lever being positioned from an unlocked to a locked position, and the cap being positioned in an unlocked to a locked position.

When the wheel lock lever 24 is in the unlocked position 52 as shown in FIG. 2, the wheel 4 can rotate freely about the axle 18 via the bearings 19. As shown in FIG. 4, when the wheel lock lever 24 is rotated downward as indicated by arrow 56, the wheel lock lever 24 pivots about the lever pivot 22 causing the wheel lock lug 26 to swing towards the hub 28 where it engages one of a plurality of wheel lock latches 16 positioned between adjacent latch guides 17. The thickness of the lug 26 and the corresponding depth of the wheel lock latches 16 is of sufficient dimension to securely but removably lock the hub 28 in a stationary position relative to the wheel lock lever 24, even when moderate rotational force is applied to wheel 4.

The latch guides 17 are formed integral with the hub 28 and are shaped to deflect the wheel lock lug 26 into the recess of the wheel lock latch 16 as the wheel lock lever 24 is rotated downward. In the preferred embodiment, the latch guides 17 have an arrow configuration and the lock lug 26 is of cylindrical shape and secures into the correspondingly shaped cavity of the lock latch 16. When the wheel lock lever 24 is in the locked position 54, the engagement of the wheel lock lug 26 in the wheel lock latch 16 prohibits rotation of the wheel 4 about the axle 18.

The hub 28 employs a plurality of wheel lock latches 16 and corresponding latch guides 17 in a radial configuration such that the wheel lock lever 24 can be pivoted to engage the wheel lock lug 26 and secure the lever into a locked position 54 when the hub is at any angle of rotation. As the lock lug 26 is rotated in towards the axle 18, the lug 26 will contact the latch guides 17 which, due to the angled sides of the latch guides 17, will force rotation of the hub 28 until the lug 26 aligns with the latch 16 opening and clicks into position where the lug 26 is retained within the latch in a secured position 58. Rotating the lock lever in the reverse direction causes the lug 26 to disengage from the latch 16 to allow the wheel 4 to rotate freely.

In the preferred embodiment of the invention, only one wheel 4 of the wheel assembly 3 has lock latches 16. Therefore, rotating the wheel lock lever 24 into the locked position 54 locks only one wheel of the wheel assembly. In an alternative embodiment, both wheels 4 have hubs 28 with lock latches 16 and the wheel lock lever 24 has two lock lugs 26 such that in the locked position 54, both wheels 4 of the tandem wheel assembly 3 are prevented from rotating.

In the preferred embodiment, the wheel lock lever 24 extends out beyond the outer diameter of the wheels 4 as shown in FIG. 1 such that the user may manipulate the wheel lock lever 24 between the locked position 54 and the unlocked position 52 using his or her foot. This eliminates the need for the user to bend over to reach down to lock or unlock the wheel lock lever 24.

Figures 3A, 3B:
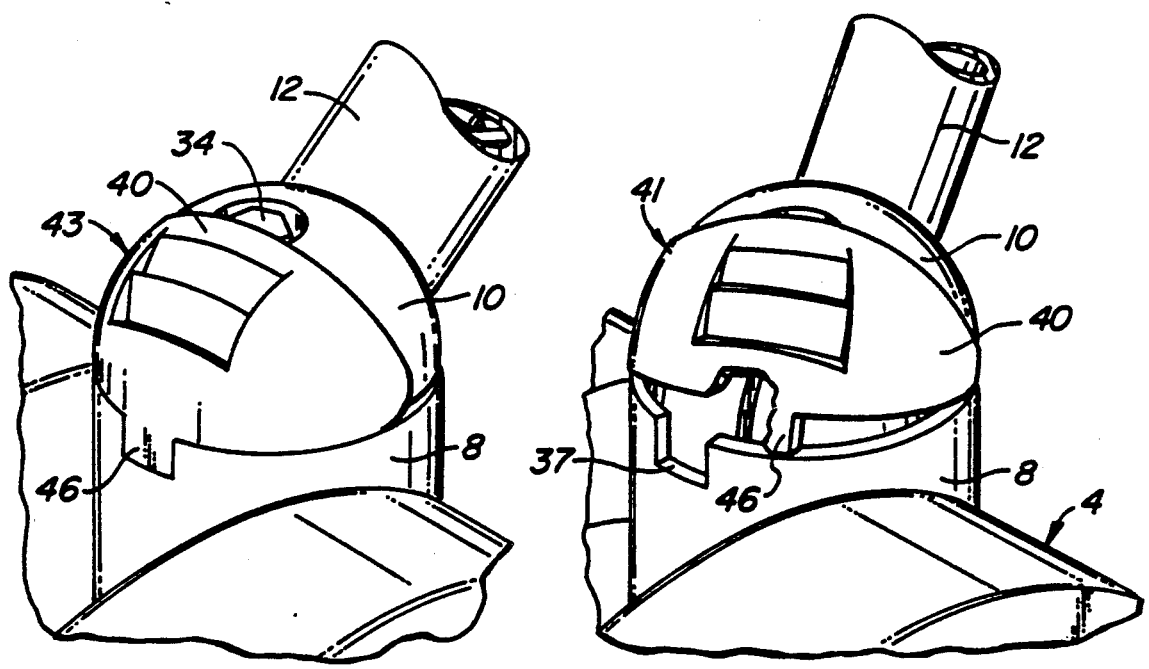
FIG. 3A is a partial view of the swivel base assembly of FIG. 1 showing a perspective of the swivel base cap in a locked position preventing swivel rotation of the wheel assembly.
FIG. 3B is a partial view of the device in FIG. 1 showing a perspective of the swivel base cap in the unlocked position with the base slightly swivelled relative to the top with a partial cut away view of the cap and tab.

A cap 40 is pivotally secured to the top 10 at a cap pivot 35 as shown in FIG. 3A and 3B. There is one cap pivot 35 on each side of cap 40. The cap 40 has multiple ridges 39 providing a gripping surface to allow the user to easily manipulate the cap between a locked position 43 as shown in FIG. 3A, and an unlocked position 41 as shown in FIG. 3B. When the cap is in the unlocked position 41, the top 10 is free to rotate relative to the base 8, and the base 8 is free to rotate relative to the top 10. Therefore, in the unlocked position, the hub and wheel assembly can react to various directional and steering forces to position the vehicle in the desired direction. When the cap 40 is moved from the unlocked position 41 to the locked position 43 as shown by arrow 45 in FIG. 4, the tab 46 extending downwardly from the cap 40 engages a cap catch 37 located in the base 8 and locks into place with a friction fit. When in the locked position 43, the top 10 is secured in an angular position relative to the base 8. In the preferred embodiment, the base 8 includes two cap catches 37, one at the front of the base 8 and one at the rear. This allows the cap 40 to lock the top 10 relative to the base 8 in one of two positions, each position 180° apart. The base 8 can be fabricated with more or less than two cap catches 37 as desired. When the cap 40 is positioned in a cap catch 37, the base 8 and the top 10 are prevented from rotating relative to one another thereby locking the wheel assembly 3 in an angular position relative to the vehicle.

This locking swivel feature, in combination with the wheel lock feature explained above, provide a hub and wheel assembly which can be fully secured such that the swivel base assembly 6 will remain in a fixed position relative to the stroller leg 15, and the wheels will remain locked in a fixed position relative to the axle 18 thus preventing wheel rotation. This condition may be desirable by the user to restrict movement or rolling of the vehicle when placed at rest on an uneven or inclined surface.

Figure 5:
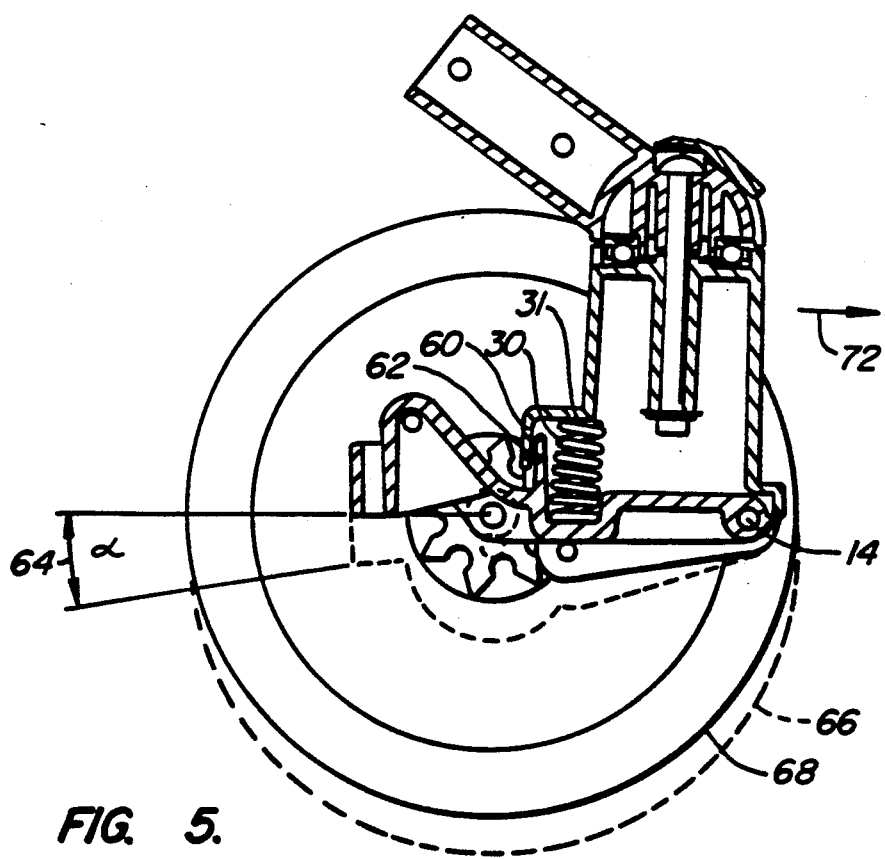
FIG. 5 is a side view of the preferred embodiment of the invention with one wheel removed to show the spring suspension system partially compressed and the resulting displacement of the wheel assembly in the vertical direction indicated by an angle α, the uncompressed position indicated in broken lines.

Referring now to the suspension system illustrated in FIGS. 4 and 5, the pivot point 14 connects the axle retainer arm 20 to the base 8 of the swivel base assembly 6. The pivot connection allows the free end of the axle retainer arm 20, and in turn the hub 28 and wheel assembly 3 secured to the axle retainer arm 20 near its free end, to displace in a vertical direction relative to the swivel base assembly 6. A suspension means, in the preferred embodiment being a spring 30, is positioned between the base 8 and the axle retainer arm 20 as shown in FIG. 4. The upper end of the spring 30 is secured to the base 8 at a spring anchor point 31 and biases the axle retainer arm 20 away from the spring anchor point 31. The lower end of the spring 30 engages the axle retainer arm 20 in a spring receptacle 33 where the spring 30 is secured and restricted from lateral movement. A downwardly extending base flange 60 is offset from a corresponding upwardly extending axle retainer flange 62 to allow the base flange 60 and retainer flange 62 to overlap when the spring 30 is in the compressed condition as shown in FIG. 5. When the axle retainer arm is fully biased outwardly, it is preferred that the extreme ends of the base flange 60 and the axle retainer flange 62 partially overlap to prevent debris from entering into the internal structure of the swivel base 8.

The degree of travel $\alpha$ of the axle retainer arm 20, shown by displacement arrow 64, can be selected by varying the length and configuration of the spring 30 as well as the dimensions of the base flange 60 and axle retainer flange 62. In the preferred embodiment of the invention, the flange configuration and spring length will allow a range of vertical displacement of the axle relative to the swivel base between 0.25 and 2.50 inches. However, the displacement can be greater or less than this range.

The axle retainer flange 62 can be used as a stop to limit compression of spring 30. As the spring 30 compresses, the axle retainer arm 20 pivots upwardly causing the axle retainer flange 62 to move towards the spring anchor point 31 until either the spring compresses completely or the axle retainer flange connects with the inside surface of the base 8. Either event would limit axle retainer arm travel in the upward direction. Alternatively, a portion of the axle retainer arm 20 can act as a stop against the swivel base flange 60 as the axle retainer arm 20 pivots upwardly and contacts downwardly extending base flange 60.

A stop 80 is positioned on the base 8 to prevent the axle retainer arm 20 from pivoting away from the spring anchor point 31 beyond the desired amount. In addition, the axle retainer arm 20 includes a finger 21 near the pivot point 14 to restrict rotation. The finger 21 abuts a stop 23 located on the base 8 to limit rotation of the axle retainer arm away from the spring anchor point 31 and thus preventing the spring 30 from fully extending and becoming loose in the swivel base assembly 6. In the preferred embodiment as shown in FIG. 4, when the hub wheel assembly 2 is not loaded, i.e., when it is not supporting any weight, the spring 30 is partially compressed and biases the axle retainer arm 20 away from the base 8 until it abuts the stop 80 and the finger 21 abuts the stop 23.

The suspension action of the hub wheel assembly 2 can be customized for the given application by varying the device used as a suspension means or the resiliency, length and number of coil turns of spring 30 when a spring is used as a suspension means. The pivoting structure of the axle retainer arm 20 relative to the base 8, particularly the offset of the axle support relative to the longitudinal axis of the swivel base assembly 6, is configured to produce a trailing link suspension configuration which allows natural displacement of the wheel when exposed to vertical and lateral loads, thereby providing a smooth and controlled cushioned ride over irregular surface conditions.

As the hub and wheel assembly attached to a vehicle which is traveling forward, the direction of motion indicated by arrow 72 in FIG. 5, surface irregularities exert a vertical force on the wheel 4 acting against the biasing force of the spring 30. The natural tendency of the wheel is to move up and back against the forward direction of the hub and wheel assembly 2 as the wheel 4 travels over the irregularity. The trailing link suspension configuration, formed by the offset of the axle relative to the swivel base assembly 6, allows the wheel to pivot up and slightly back to absorb the vertical force by compressing spring 30 as the wheel rolls up and over the irregularity. Four hub and wheel assemblies of the preferred embodiment can be attached to a vehicle such as a baby carriage or stroller, one at each corner leg, to provide a stable and smooth suspension system capable of locking into position relative to rolling movement and wheel assembly swivel movement.

The foregoing description of the preferred embodiment of the invention has been presented for purposes of illustration and description. It is not intended to be exhaustive or to limit the invention to the precise form disclosed, and obviously many modifications and variations are possible in light of the above teaching. For example, alternative shock absorbing means can replace the use of a spring disclosed in the preferred embodiment. Hydraulic or air suspension systems could be employed as well as resilient cushioning pads. In addition, the stroller leg housing could be positioned relative to the swivel base assembly at various angles and having various configurations to conform with the particular vehicle frame or application The embodiments chosen and described in this description were selected to best explain the principles of the invention and its practical application to thereby enable others skilled in the art to best utilize the invention in various embodiments and with various modifications as are suited for the particular use contemplated. It is intended that the scope of the invention be defined by the claims appended hereto.

What is claimed is:

1. A hub and wheel assembly for supporting a movable vehicle, comprising:
   a swivel housing means having a top portion swivel mounted to a base portion and bearing means for providing rotational movement of said base portion relative to said top portion about a first axis, the top portion having means for connecting to a vehicle chassis or frame member;
   a wheel assembly having an axle, a first wheel and a second wheel rotationally engaged with the axle about a second axis, the first wheel having a hub with a wheel lock latch;
   a suspension means disposed generally between the first wheel and the second wheel, said suspension means including an axle retainer arm pivotally attached to said base portion about a third axis, the third axis being spaced apart from the second axis, said axle retainer arm supporting said axle, and a resilient member having a first end and a second end, the first end communicating with the base portion and the second end communicating with the axle retainer arm between the second axis and the third axis, wherein said resilient member biases the axle generally away from the top portion;
   a wheel lock lever pivotally connected to the axle retainer arm and having means for engaging the wheel lock latch to thereby lock the first wheel into a secured position to prevent the first wheel from rotating relative to the axle retainer arm; and
   a swivel locking means for releasably securing said top portion in a fixed position relative to said base portion, the swivel locking means including a moveable tab coupled to the top portion and a corresponding catch coupled to the base portion.

2. The hub and wheel assembly of claim 1, wherein the swivel locking means includes a cap pivotally coupled to the top portion about a fourth axis the tab being mounted on the cap and the catch being positioned on the base portion and configured to receive the tab, wherein when the tab is positioned in the catch, the base portion is prevented from rotational movement along the first axis.

3. The hub and wheel assembly of claim 2 wherein the fourth axis is generally transverse to the first axis and the cap includes a ridge on an outer surface of said cap.

4. The hub and wheel assembly of claim 1, wherein said bearing means includes a thrust bearing and the resilient member is configured as a spring.

5. The hub and wheel assembly of claim 1 wherein the resilient member comprises a spring.

6. The hub and wheel assembly of claim 1 wherein the suspension means further comprises an overlapping flange portion fully housing the resilient member without restricting pivotal movement of the axle retainer arm.

7. The hub and wheel assembly of claim 1 wherein the means for engaging the wheel lock latch is a lug having a substantially circular perimeter and extends in a direction towards the first wheel, the wheel lock latch configured to releasably engage the lug when the wheel lock lever is rotated to position the lug in the wheel lock latch.

8. A wheel assembly for supporting a movable vehicle, comprising:
   a swivel base assembly having a top portion, a base portion, a cap and a bearing member, the top portion configured having a generally dome-shaped upper surface with a leg housing extending outwardly therefrom, the base portion rotationally coupled to the top portion through the bearing member about a substantially vertical first axis, the base portion including a catch, the cap pivotally secured to the top portion configured to conform to the dome-shaped upper surface thereof, the cap having a tab positionable between a first position and a second position wherein in the first position the tab engages the catch to secure the top portion and the base portion in a locked angular position relative to each other and in the second position the base is allowed to freely rotate relative to the top portion;

an axle retainer arm having a pivot end and a free end, the pivot end pivotally attached to the base portion and the free end extending outwardly from the base portion;

an axle mounted to the axle retainer arm between the pivot end and the free end;

a wheel having a hub rotationally secured to the axle, the hub having a wheel lock latch;

a wheel lock lever pivotally secured to the axle retainer arm between the pivot end and the free end, the wheel lock lever having a lug extending outwardly therefrom in a direction towards the hub, the lug releasably positionable in the wheel lock latch to lock the rotation of the wheel in a substantially fixed position relative to the axle retainer arm; and a resilient member having a first end and a second end, the first end coupled to the axle retainer arm at a position between the pivot end and the free end, the second end coupled to the base portion, the resilient member biasing the axle generally away from the top portion to provide cushioned suspension of the axle.

9. The wheel assembly of claim 8 further comprising a base flange secured to the base portion and configured to surround the second end of the resilient member, an axle retainer arm flange secured to the axle retainer arm between the first end of the resilient member and the free end of the axle retainer arm and configured to surround the first end of the resilient member, the base flange and the axle retainer arm flange configured to overlap and thereby enclose the resilient member without restricting compression of the resilient member.

10. The wheel assembly of claim 8 wherein the resilient member comprises a spring.

11. The wheel assembly of claim 8 further comprising a plurality of wheel lock latches radially spaced on the hub, each wheel lock latch separated by a latch guide, the latch guide configured having paired outside surfaces generally connecting at a tip and diverging to link adjacent wheel lock latches, the outside surfaces deflecting the lug into a wheel lock latch as the wheel lock lever is pivoted in a direction towards the wheel lock latch to releasably secure the lug in the wheel lock latch.

12. The wheel assembly of claim 8 wherein the cap includes a ridged outer surface to enhance frictional engagement with the cap to pivot the tab between the first and second positions.

13. The wheel assembly of claim 8 wherein the axle has a first end and a second end and is coupled to the retainer arm therebetween, the wheel assembly further comprising two shells in tandem, a first wheel rotationally mounted to the first end of the axle and a second wheel mounted on the second end of the axle, wherein the base and the resilient member are positioned between the first wheel and the second wheel.

* * * * *